US009238287B2

(12) United States Patent
Gardner et al.

(10) Patent No.: US 9,238,287 B2
(45) Date of Patent: Jan. 19, 2016

(54) MULTI-NOZZLE MACHINE TOOL COOLING SYSTEM

(75) Inventors: Stephen R. Gardner, Tolland, CT (US); Gary L. Gardner, Somers, CT (US); Marc R. Warren, Colchester, CT (US)

(73) Assignee: Dimensional Control, Inc., South Windsor, CT (US)

( * ) Notice: Subject to any disclaimer, the term of this patent is extended or adjusted under 35 U.S.C. 154(b) by 652 days.

(21) Appl. No.: 13/478,493

(22) Filed: May 23, 2012

(65) Prior Publication Data

US 2012/0308323 A1 Dec. 6, 2012

Related U.S. Application Data

(60) Provisional application No. 61/519,473, filed on May 23, 2011.

(51) Int. Cl.
*B23Q 11/10* (2006.01)

(52) U.S. Cl.
CPC ........... *B23Q 11/1076* (2013.01); *Y10T 408/44* (2015.01); *Y10T 408/46* (2015.01); *Y10T 409/30112* (2015.01); *Y10T 409/302968* (2015.01); *Y10T 409/303752* (2015.01); *Y10T 409/303976* (2015.01); *Y10T 409/304032* (2015.01)

(58) Field of Classification Search
USPC ................ 408/61, 60, 56, 1 R; 409/136, 135; 239/290–292, 296, 548, 556
See application file for complete search history.

(56) References Cited

U.S. PATENT DOCUMENTS

| 4,573,833 | A  | * | 3/1986  | Kondo .............................. 408/3 |
| 5,186,394 | A  | * | 2/1993  | Tsuji ........................... 239/587.4 |
| 6,772,042 | B1 | * | 8/2004  | Warren et al. ................. 700/177 |
| 7,033,308 | B2 | * | 4/2006  | Fujimoto et al. ................ 483/13 |
| 7,134,812 | B2 | * | 11/2006 | Beckington ..................... 408/56 |
| 7,182,674 | B2 | * | 2/2007  | Mundt ............................ 451/53 |
| 7,931,427 | B1 | * | 4/2011  | McArthur ..................... 409/136 |
| 8,784,022 | B2 | * | 7/2014  | Leishman et al. ............ 409/136 |
| 2002/0146297 | A1 | * | 10/2002 | Curtis ........................... 409/132 |

FOREIGN PATENT DOCUMENTS

| JP | 06206139 A | * | 7/1994 |
| JP | 06315854 A | * | 11/1994 |
| JP | 11320326 A | * | 11/1999 |

OTHER PUBLICATIONS

JP 06-315854 Machine Translation.*

* cited by examiner

*Primary Examiner* — Daniel Howell
*Assistant Examiner* — Nicole N Ramos
(74) *Attorney, Agent, or Firm* — Alix, Yale & Ristas, LLP

(57) ABSTRACT

Multiple fluid nozzles are mounted in a machine tool such that the cutting tool in the spindle is targeted with liquid or gas cutting fluid from multiple directions, providing better coverage and thereby more effectiveness. This provides more efficient and safer use of a machine tool by automating the aiming of fluids at a desired location. Multiple nozzles at respective multiple physical locations are preferably controlled by a single control unit, so they can be synchronized to maintain a common target point on a cutting tool, even if the nozzles are located asymmetrically or non-uniformly with respect to the spindle axis or target point. Preferably, modular nozzle assemblies can be configured for flexibility in mounting on the machine tool.

20 Claims, 10 Drawing Sheets

MULTI-NOZZLE MACHINE TOOL COOLING SYSTEM

RELATED APPLICATION

This application claims the benefit under 35 USC 119(e), of U.S. Provisional Application No. 61/519,473 filed May 23, 2011 for "Multi-Nozzle Machine Tool Cooling System", the entire disclosure of which is hereby incorporated by reference.

BACKGROUND

The present invention relates to the cooling of machine tools, and in particular to the cooling of the cutting tool with a fluid (i.e., gas or liquid or combination). The fluid typically cools and lubricates the "cut" which can be considered as the interface of the cutter and work piece. It also serves to push the chips that are created away from the cutting area. In some cases only compressed air is used, which has minimal cooling properties and no lubrication properties, but only serves to blow the chips out of the way. As used herein, "fluid", "cooling fluid", and "cutting fluid" should be considered synonymous and applicable to any of cooling, lubricating, or chip removal with liquid and/or gas.

SUMMARY

The present invention is an improvement on the machine tool cooling system described in U.S. Pat. No. 6,772,042 B1 issued Aug. 3, 2004 for "Programmable Coolant Nozzle System", the disclosure of which is hereby incorporated by reference.

The present invention differs in that multiple nozzles can be mounted in a machine tool such that the cutting tool in the spindle is targeted with cutting fluid from multiple directions, providing better coverage and thereby more effectiveness. This prevents problems that can arise when the cutting tool engages the work piece in such a way that a single coolant stream could be obstructed by the work piece, fixtures, or other objects.

In one aspect, the disclosure is directed to a cooling system for a machine tool comprising a plurality of nozzle assemblies, each independently mountable on the machine tool and connectable to a source of cooling fluid. A respective nozzle is pivotally supported in each nozzle assembly. Each nozzle defines a nozzle axis along which cooling fluid can be directed from each nozzle assembly. A control system is operatively associated with the plurality of nozzle assemblies, for delivering control signals that pivot each nozzle to align the respective nozzle axes relative to either a common target position or distinct positions in the machine tool and direct simultaneous flows of cooling fluid from the nozzles to the target position or positions.

The preferred operator interface to the control system (MCU) includes one or more of a detented optical encoder (DOE) having an integrated push button switch (PBS). The push button switch is used to switch between operating and programming modes, independent and synchronized operation, and to store values as set by rotation of the DOE. When the DOE is rotated, one or more nozzle assemblies will respond by moving nozzles in a direction commensurate with rotation of the encoder. In synchronized programming mode, an internal algorithm is used to simultaneously coordinate angular movement of the nozzles such that the fluid exiting the nozzles will intersect a common target point in three dimensional space. During synchronized programming, rotation of the DOE moves each of a plurality of nozzles simultaneously while maintaining aim from each nozzle at the common target point. In independent programming mode each nozzle is controlled using the DOE in an identical fashion to synchronized except that each of a plurality of nozzles will respond individually either in sequence, or as selected by an optional toggle switch or other means. During automatic operation, nozzles will position simultaneously to either a previously synchronized common target point, or to different points set independently.

A method counterpart includes the steps of mounting a plurality of nozzle assemblies on the machine tool offset from the spindle axis, with each nozzle assembly having an actuator for pivoting a nozzle that dispenses a cooling fluid in a nozzle axial flow direction, and connecting the nozzle assemblies to a control system that coordinates the actuators to aim the axial flow direction of each nozzle to a common target position or distinct positions along the spindle axis.

The invention facilitates more efficient and safer use of a machine tool by automating the aiming of cutting fluids (liquid or gas) at a desired location. Multiple nozzles at respective multiple physical locations are preferably controlled by a single control unit, so they can be synchronized to maintain flow on a cutting tool, even if the nozzles are located asymmetrically or non-uniformly with respect to the spindle axis or target point.

Because machine tools use multiple cutting tools to perform different machining operations, the optimal locations to apply cutting fluid for each tool vary significantly from tool to tool, or operation to operation. Conventionally, this variation often requires operator intervention in order to perform a manual adjustment, whereas according to the present disclosure no such intervention is required.

In a further improvement, each nozzle assembly is preferably constructed with reversible mounting hardware and interchangeable drive elements such that one basic configuration can be adapted for mounting with different orientations at different locations on the machine tool.

In this aspect, the nozzle assembly comprises a body connectable to a source of fluid coolant, a nozzle that is pivotable in the body and extends along a nozzle axis from a rotating coolant union integrated with the body, and a bracket for mounting the body on a machine tool. A distinct electromechanical actuator is detachably mounted on the body and has a drive element that is operatively connected to the nozzle for pivoting the nozzle. The body is mountable on the machine tool with the bracket in at least two alternative locations around the spindle axis such that when in any of the alternative locations the nozzle axis is directed at the spindle axis.

Preferably, the body has a front, back, top, bottom, and left and right sides. The tubular nozzle has an inner, inlet end attached to a rotor. The rotor is a rotatable component of the body which is secured by a bearing within a rotor block. The nozzle inlet is fluidly accessible through an opening in a stator block in the body and a passage in the rotor, and has an axis of rotation that extends longitudinally from front to back within the body. The nozzle has a neutral position projecting vertically downward from the bottom of the body and an active position that is angulated toward one side relative to vertical. The electromechanical actuator also has front, back, top, bottom, and left and right sides, and an external electric connector. The drive shaft projects from the back of the actuator into the opening in the rotor block. The rotor and drive shaft have a cooperating key and slot whereby the nozzle is continuously pivotable between the neutral position and the active position.

A mounting bracket extends vertically from the top, closer to one of the left or right sides of the body, and is preferably in the form of a longitudinal plate having spaced apart longitudinal slots. The bracket can be in the form of an angle bracket attached to the body. Usually, in a set of two coolant nozzle assemblies for mounting at 180 deg. spacing around the spindle axis, the mounting bracket on the body of a first coolant nozzle assembly extends vertically closer to the left side and the mounting bracket on the body of a second coolant nozzle assembly extends vertically closer to the right side.

Mounting flexibility is achieved in that the body or rotor block has a first plurality of fastener members and the electromechanical actuator has a lesser second number of fastener members, whereby the fastener members on the actuator can be alternatively mated with at least two different subsets of fastener members on the body or rotor block, and thereby define at least two, preferably at least four, different configurations of the nozzle assembly.

The components needed to make a complete functional system will vary from machine to machine, operation to operation, and work piece to work piece, but in general will be comprised of nozzle assemblies, control unit, cabling, and installation hardware.

BRIEF DESCRIPTION OF THE DRAWING

Aspects of the invention will be described in greater detail below, with reference to the accompanying drawing, in which.

DETAILED DESCRIPTION

Figure 1:
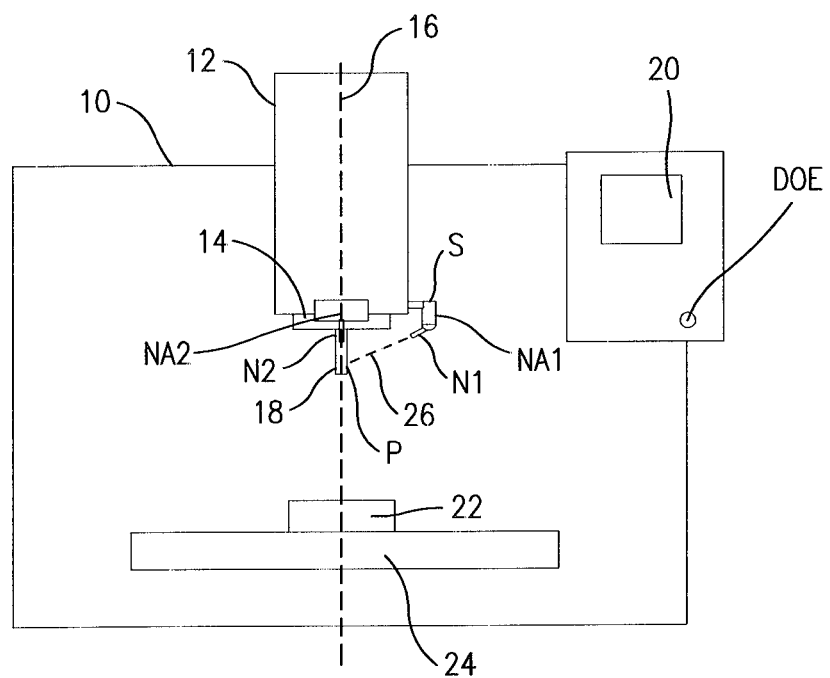
FIG. 1 is a schematic of one system embodiment of the invention.

A system embodiment of the invention is shown in FIG. 1. A CNC vertical machining center 10 has a turret head, body or the like 12 including spindle 14 that is rotatable around a spindle centerline or axis 16. A cutting tool 18 is mounted in the spindle 14 and likewise rotates about the spindle axis 16. The machining center 10 is under the control of a CNC control console 20. A work piece 22 is secured to table 24 at a location that is intersected by the axis 16, whereby the vertical movement of the spindle 14 or body 12 and optional horizontal movement of the body 12 can be controlled so that the rotating tool 18 cuts into the work piece 22 according to a programmed pattern and sequence.

According to the present disclosure, two nozzle assemblies NA1 and NA2 are mounted on or in fixed relation to the body 12. Each nozzle assembly has a respective nozzle N1 and N2. In the illustrated embodiment, the nozzle assemblies NA1 and NA2 are mounted on the body 12 at locations that are separated by 90 degrees around the spindle axis, but additional nozzle assemblies and/or other separation angles can be employed. Each nozzle N1 and N2 is pivotable within an angular range in a respective common plane on which the spindle axis 16 lies, and has a nozzle axis 26 which intersects the spindle axis 16 throughout the angular range. In FIG. 1, the nozzles N1 and N2 move in perpendicularly oriented planes. Each nozzle assembly such as NA1 is connected to a supply of cooling fluid S (only one shown).

In a manner to be described in greater detail below, a cooling control system is operatively associated with the plurality of nozzle assemblies NA1, NA2 for delivering control signals that pivot each nozzle N1, N2 to align the respective nozzle axes 26 relative to a common target position or point P in the machine tool and thereby direct simultaneous flows of cooling fluid from the plurality of nozzles to the target position.

Figure 2:
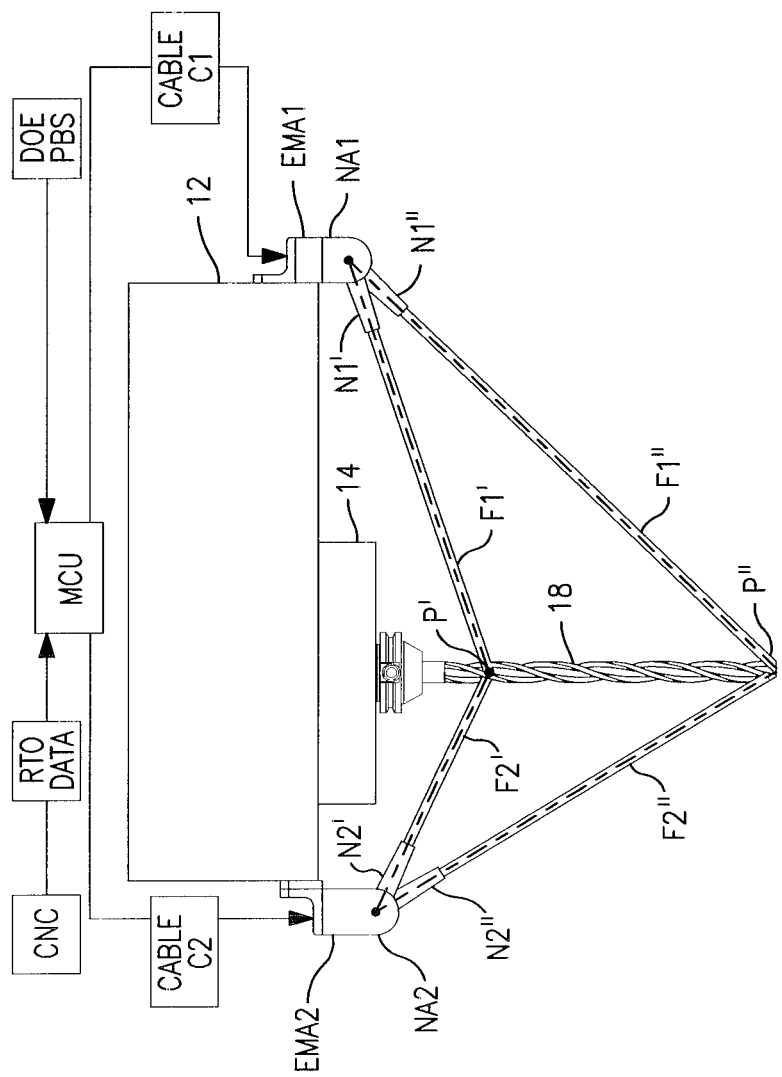
FIG. 2 is illustrates how two nozzle assemblies direct cooling flow at two different positions on the axis of the cutting tool under an analog control scheme.

FIG. 2 shows two nozzle assemblies NA1 and NA2 mounted 180 deg. apart on body 12, with the nozzles N1' and N2' aimed and delivering flow streams F1' and F2' at a first position P' and then aimed N1" and N2" and delivering flow F1" and F2" at an alternative position P". Generally, these target positions would be on the cutting tool 18. It should be appreciated that the system includes the option of nozzle assembly NA1 directing flow at position P' while nozzle assembly NA2 directs flow to a different position P".

Nozzle Assembly Configuration

Figure 3:
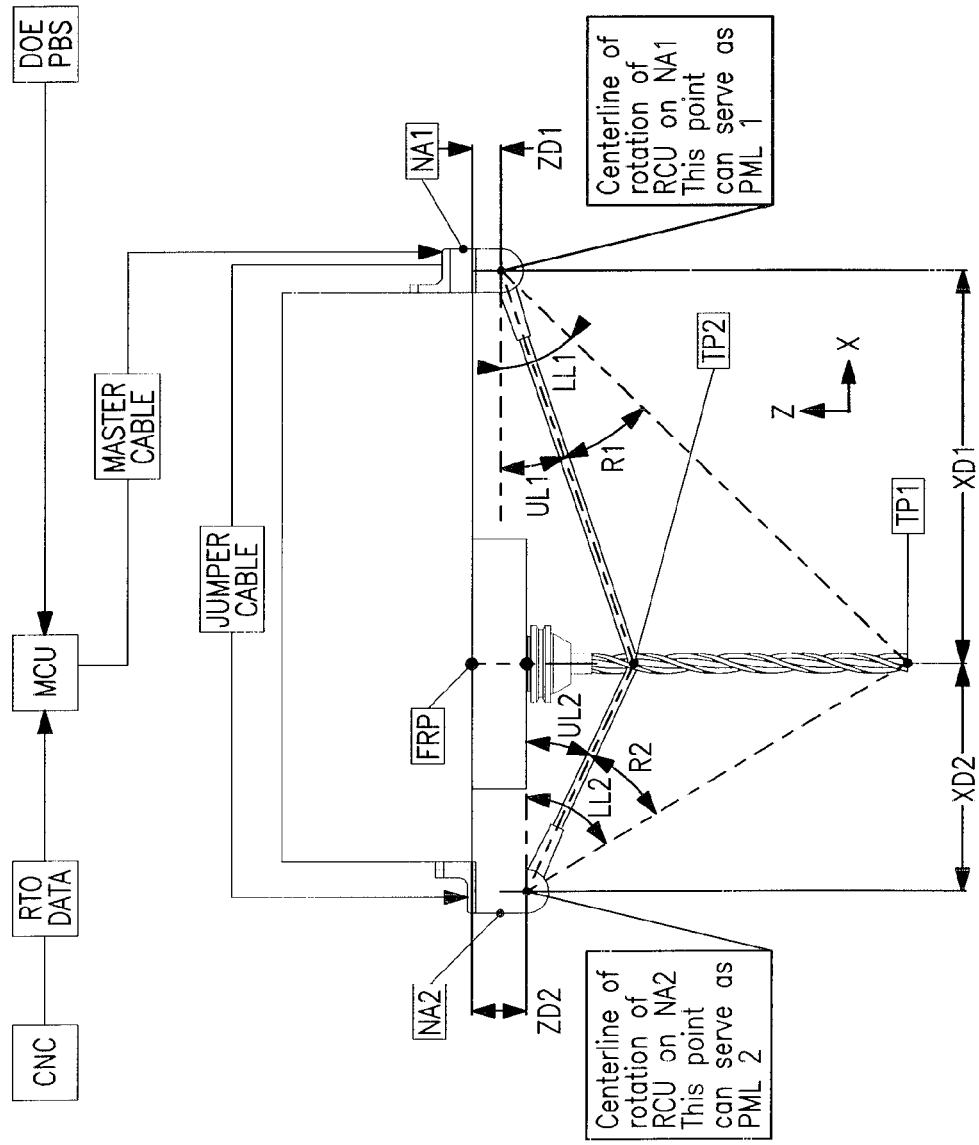
FIG. 3 is a system schematic of daisy chain control, with nomenclature used in the calculations described in the Appendix.

Two versions of nozzle assembly configuration and control can be provided, as represented in FIGS. 2 and 3, respectively.

In the analog version (FIG. 2), electro-mechanical actuators (EMA 1 and EMA 2) are electrically controlled. The control unit (MCU) now has up to four EMA outputs enabling the MCU to control up to four NA's simultaneously. This version requires individual cables (such as C1 and C2) running from the MCU to each NA (such as NA1 and NA 2). The RTO and/or DOE inputs to the MCU are essentially the same as will be described below with respect to FIG. 3.

In the Daisy Chain version (FIG. 3) each NA also contains a microprocessor based central processing unit (CPU) integrated within the EMA for handling on board logic, processing and memory functions. This frees up much of the processor requirements of the MCU, allowing its resources to be more effectively utilized. An additional connector is present on each NA, creating an output to connect an additional NA. Up to four NA's can be connected in the daisy chain, and controlled simultaneously. A master cable is routed from the MCU to the first NA (NA1). Additional NA's are referred to as NA2, NA3, NA4 respectively. A jumper cable, usually shorter, is used to connect NA1, to NA2. An additional jumper cable connects NA2 to NA3. An additional jumper cable connects NA3 to NA4.

Since the MCU is usually installed in an electrical cabinet separate from the machine enclosure where the NA's are located, the daisy chain system greatly simplifies installation in that a single cable instead of one for each NA can be routed from the MCU to NA1. Routing cables through various passageways can be difficult, time consuming, and involve space constraints. It is also more difficult to replace in the event of a failure, and adds cost to the system.

Because additional NA's can be electrically interfaced by connecting to existing NA's, adding additional NA's at a later date than the initial installation is much more practical and cost effective. Each NA is assigned a digital address. Digital commands in the form of a serial data stream are transmitted from the MCU, through the master cable, to NA1. The commands contain addressing information to distinguish which NA(s) are intended to receive and act upon which portion of the information stream, as well as information instructing each intended NA to perform a particular function.

NA1 first distinguishes if the information is intended for it or not. If not, NA1 transmits the information to NA2. This process is repeated through each NA until the NA for which the command is intended receives the information. When the intended NA receives its command, it recalls a set of instructions contained within its internal CPU and associated memory. The intended NA then responds by positioning its EMA and therefore its nozzle accordingly. Each NA nozzle can do the following upon receipt of an electrical command:

(1) Rotate (pivot) clockwise and counterclockwise on either side of the nozzle axis through a total angle of at least about 100 degrees, preferably 170 degrees;

(2) Rotate to a previously stored angle, stop and hold position until another command is received;

(3) Rotate continuously CW and CCW between two previously stored angles until another command is received. This is referred to as Sweep Cycle (SC).

(4) Rotate CW or CCW in direct response to user input via rotation of the Detented Optical Encoder (DOE).

(5) Initiate storage of diagnostic data.

(6) Transmit diagnostic data.

Each NA, the MCU and the corresponding cabling are capable of bi-directional communication. Upon receipt of a command, any of the NA's can retrieve and send data back through the chain and to the MCU or other device configured to receive the same type of data.

Since each daisy chain version of EMA contains an on board CPU with internal memory, it is capable of storing various diagnostic information relating to its usage. This information can be used for reporting of error conditions, failure conditions, or general status conditions. Information can be transmitted and acted upon in real time, or accumulated for future use. This information can consist of but is not limited to the following:

(1) Electrical Current draw of the EMA
(2) Accumulation of run time
(3) Total positioning distance
(4) Total time in sweep cycle mode
(5) Angular positioning data Control Unit (MCU)

The Control Unit interfaces with the Computer Numerical Control (CNC). More interface options between the system as disclosed herein and the machining center's CNC control are available for the dual purpose of determining which tool is in the spindle of the machine, as well as directly controlling the desired angles of the NA's, and the ability to control related external devices via command from the CNC to the MCU. Related external devices would include solenoid valves, relays and the like.

Many machine tools have a feature often known as DPRNT, PUT, SPRNT, and others which for the purpose of this document will be collectively referred to as Real Time Output (RTO). This feature allows the CNC control to transmit RTO serial data via RS232 serial communications or other means. Real time means that the RTO data is executed from within the CNC program being used to machine a part, as the program is being executed by the CNC. RTO data can be used to send the number of the current tool in the spindle directly to the MCU. This number can be formatted and sent as literal text, or many CNC controls store a variable that represents the number of the tool presently in the spindle, known as the Tool Number Variable (TNV).

Furthermore, many CNC's already use a subprogram often referred to as a Tool Change Macro (TCM). In these cases, the TCM is executed by the CNC when the program calls for the Automatic Tool Changer (ATC) to perform a tool change. RTO commands used to send information to the MCU can be embedded within the TCM, or be contained directly in the CNC program. RTO commands can retrieve the TNV and format the data appropriately for transmission to the MCU. Many advantages include discreet transmission of a number rather than intercepting various signals generated by the machine tool and extrapolating a number.

RTO data can also be used to send other information such as a program number, or direct angular data intended for particular NA's. Furthermore, special RTO macros can be created to poll other CNC variables such as Tool Length Offset (TLO), Tool Diameter (ID), as well as user configurable variables. The numeric values of these variables can be used to perform mathematical computations within a macro for the purpose of automatically generating angular positioning information intended for NA's to be transmitted to the MCU.

The schematic of FIG. 3 illustrates dual nozzle synchronization but the technique can readily be expanded for additional nozzles (i.e., it would be NAS1, NAS2, NAS3 and SR1, SR2, SR3, and SSR1, SSR2, SSR3, etc.) The Appendix describes this in more detail.

Mounting Configuration (MC) is to be understood as the relationship of the physical mounting location of each NA to each other in reference to a fixed point. In the usual implementation the nozzle assemblies are fixed in relation to the machine tool frame, but the method could be extended whereby the nozzle assemblies are fixed relative to each other but displaceable as a group in synchronism with, e.g., the spindle. Two options are Symmetrical and Asymmetrical mounting configurations.

In the preferred implementation, the Fixed Reference Point (FRP) is usually but not limited to a particular location along the centerline of a machine tool spindle. The Target Point (TP) is usually but not limited to a particular location along the same centerline of a machine tool spindle upon which the FRP is located. The Physical mounting location (PML) of each NA can be described as a three dimensional (3D) position consisting of an X, Y, and Z-axis coordinate as referenced to the FRP. Conventionally, the Z axis is the spindle axis, usually vertical or horizontal.

If each NA's PML were located at X, Y, and Z coordinates relative to the FRP such that identical angular rotation of each NA's EMA projected the fluid streams exiting the nozzles to intersect each other at the same TP, the mounting configuration is considered symmetrical. While a symmetrical mounting configuration would make the system far simpler to implement, great variations in physical designs of machine tools, combined with a vast array of practical limitations, mounting the NA's symmetrically precisely enough for the application is highly improbable, and at the least impractical. In this context, "precisely enough" should be understood in that angular rotation of each NA shall be within plus or minus one tenth of a degree of each other in order to maintain fluid stream intersection at the same TP.

If each NA's PML were located at X, Y, and Z coordinates such that identical angular rotation of each NA would not project the fluid streams exiting the nozzles to intersect each other at the same TP, the mounting configuration is considered asymmetrical. To accommodate an asymmetrical MC, the invention uses mathematical computations and algorithms based upon the Pythagorean theorem to control the NA's EMA's in such a way as to mathematically proportion the angles of rotation of each NA's EMA relative to each other such that the exiting fluid streams do indeed intersect at the same TP. Furthermore, the actual X, Y and Z coordinate of each NA's PML relative to the FRP does not need to be known by the user or installer.

The present invention can include a way of automatically determining the necessary variables needed to complete the algorithm. This is accomplished via a "teach" function wherein a human operator controls the angular position of each NA based upon rotation of the DOE. In SSM, rotating the DOE to adjust the angle of each nozzle, the operator visually aims the exiting fluid streams at the same TP, then depresses a Push Button Switch (PBS) integrated within the DOE to "teach" the angle of rotation required for the nozzle to project the fluid at the TP. This process is repeated for each nozzle.

Based on the angular information derived by this process, the MCU uses various mathematical computations to determine the necessary variables needed to complete a mathematically correct algorithm needed to maintain a common TP for each nozzle.

The Programming mode can be described as "teaching" or otherwise storing desired angular positions for each NA. These positions correspond with different tools or CNC programs within the machining center. Programming can be accomplished via direct operator control of the DOE, or via serial or other type of electronic communication from the CNC to the MCU.

The Operating Mode can be described as automatic positioning of the NA's EMA to previously stored or directly commanded angular positions.

At least two styles of programming and operation can be defined within the Analog and Daisy Chain. For the Independent Style each NA is positioned independently during programming mode such that the fluid streams exiting each NA nozzle can be projected to different points. During operating mode the fluid streams are simultaneously directed to different points along the spindle centerline. For the Synchronized Style each NA is positioned simultaneously during operating or programming mode. Each NA's angle is adjusted proportionately such that the coolant stream exiting each NA is projected to intersect the same point in a three dimensional atmosphere. This point is usually located at a particular position along the axis of a cutting tool in a machine tool spindle. It should be appreciated that machining centers can have cutting tools oriented vertically, horizontally, or both, and that the machine head on which the nozzle assemblies are mounted according to the present disclosure can swivel up and down and/or rotate in addition to sliding vertically and/or horizontally. In all of these cases the proximity of the nozzle assemblies to the spindle centerline remains constant and the terms vertical and horizontal as used or implied herein are strictly reference planes based upon a particular point of view.

The operator can switch between Synchronized and Independent programming styles. The system can be set in parameters to default to one style or the other on initial power up. Each tool is memorized with the particular style with which it was set. Starting from operating mode, pushing and holding the PBS for a period of one second (this amount of time is arbitrary and adjustable by software), the system will switch from one style to the other.

One of the methods of programming is by "teach" using the DOE. If necessary, switch to independent style as previously described. The user depresses the PBS. Rotation of the DOE causes the MCU to signal the NA1 to respond by rotating its EMA causing the nozzle to rotate about its centerline axis. The direction of rotation of the EMA is commensurate with the direction of rotation of the DOE. The fluid stream exiting the nozzle is viewed by the operator and visually aimed at a desired point, usually on the length of a cutting tool in the machining center spindle. This point corresponds with the angle of rotation of the EMA.

Depressing the PBS causes the MCU to memorize the angular position. Further rotation of the DOE will cause the same NA to rotate to a second angular position for the purpose of setting a Sweep Cycle (SC). If a single angular position is desired, the operator does not rotate the DOE again, and pushes the PBS to memorize the identical angle, causing the system to store two identical angles and therefore not sweep. If a SC is desired, the operator rotates the DOE to the second desired angle then pushes the PBS to memorize the second angle and advance programming to NA2. During operating mode, the nozzle will continuously sweep between the two angles. This process is repeated for each of the NA's in the system. When advanced to the last NA in the system, and the PBS is pushed for the second time, the system will revert to operating mode.

For Synchronized Style Programming, the operator remains in or switches to synchronized style as previously described. The user depresses the PBS. In synchronized style, each of the NA's responds to rotation of the DOE simultaneously, causing each EMA to rotate at proportionate angles as to maintain targeting of fluid streams exiting the nozzles at a common TP. By rotating the DOE, the operator visually chooses a TP upon which to target the fluid streams exiting the nozzles. The proportionate angles of rotation of the EMA's are of particular importance in this style/mode. Because the nozzles move simultaneously and the fluid streams intersect a particular TP in 3D space, the angles of rotation must be proportionate and of a significantly fine resolution as to cause them to move in a smooth fashion without noticeable "jitter".

When the first desired point is reached, the operator depresses the PBS. The MCU memorizes the angular locations of the EMA's in each NA. Further rotation of the DOE will again cause each of the NA's EMA to rotate in proportionate angles as to maintain a common TP of the fluid streams. If a single angular position for each NA is desired, the operator does not rotate the DOE again, and pushes the PBS a second time to memorize the angle for each NA, causing the system to store two identical sets of angles. In this case a single TP is memorized for all NA's and the system reverts to operating mode.

If a SC is desired, after setting the first TP and depressing the PBS, the operator rotates the DOE to position the fluid streams to the second desired TP. Pushing the PBS now memorizes the angles of each EMA for the second TP and places the system in Operation Mode. During operation, the nozzle will continuously sweep between the two TP's.

Programming can also be achieved by Direct Angle. Using RTO as previously described, the CNC can communicate direct angular commands for each NA to the MCU. The NA's will respond by rotating their EMA's accordingly.

Universal Nozzle Assembly

FIGS. 4-10 describe another aspect of the preferred embodiment that can be used for only a single nozzle or each of multiple nozzles and is therefore independent of the control technique. The universal nozzle assembly can be mounted in any of several orientations, especially reversal of the "top" and "bottom".

Figure 4:
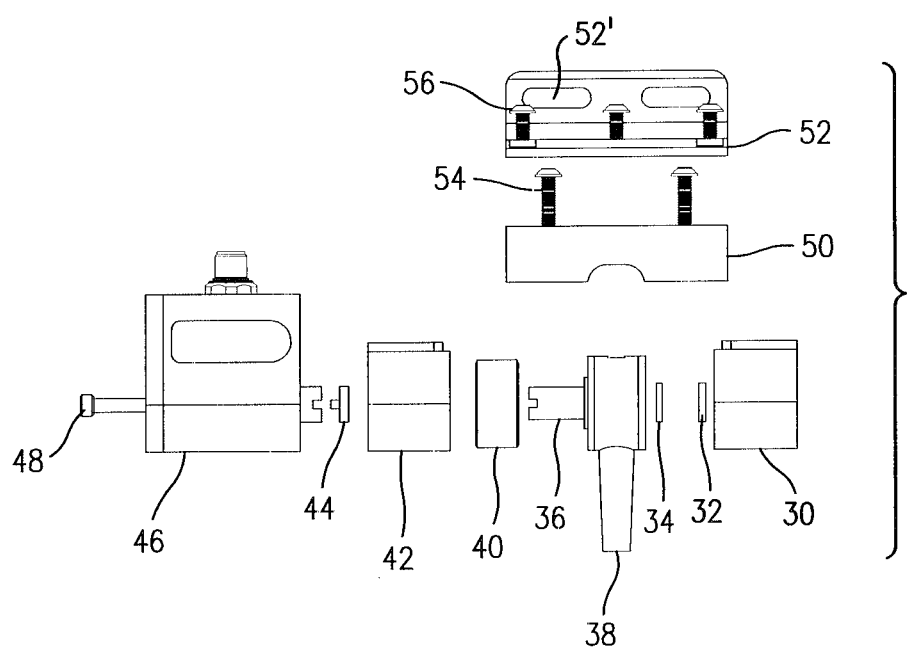
FIG. 4 is an exploded right side view of the components in a preferred embodiment of a universal nozzle assembly usable in an analog control scheme.

FIG. 4 shows an exploded right side view of such an NA 28. In FIG. 4, component item numbers 30-42, 50 and 54 collectively comprise the integrated Rotating Coolant Union (RCU). Fluid or gas enters Stator Block 30 and passes through stationary and rotating seals 32, 34 into rotor 36 and exits through nozzle tube 38. Items 34, 36, 38 are rotatable about a common centerline while the mating surfaces of seals 32, 34 prevent fluid or gas from escaping. The rotor 36 engages with the bearing 40 which is inserted into and supported by the rotor block 42. Stator block 30 and rotor block 42 are fastened to the chassis 50 by four screws 54.

EMA 46 (servo motor assembly) fastens to rotor block 42 via two screws 48. The output shaft of EMA 46 is coupled with rotor 36 via drive key 44. The drive key 44 acts as a floating flex coupling for transmission of EMA shaft rotation while compensating for minor variations in alignment to prevent unnecessary stress on any of the components. Angle bracket 52 fastens to chassis 50 with three screws 56. The angle bracket 52 and its pair of oblong mounting holes 52' are symmetrical such that the bracket can be fastened to the chassis with the vertical face of the bracket oriented at either the left (normal orientation) or right (reverse orientation) faces of the NA.

Figure 5A:
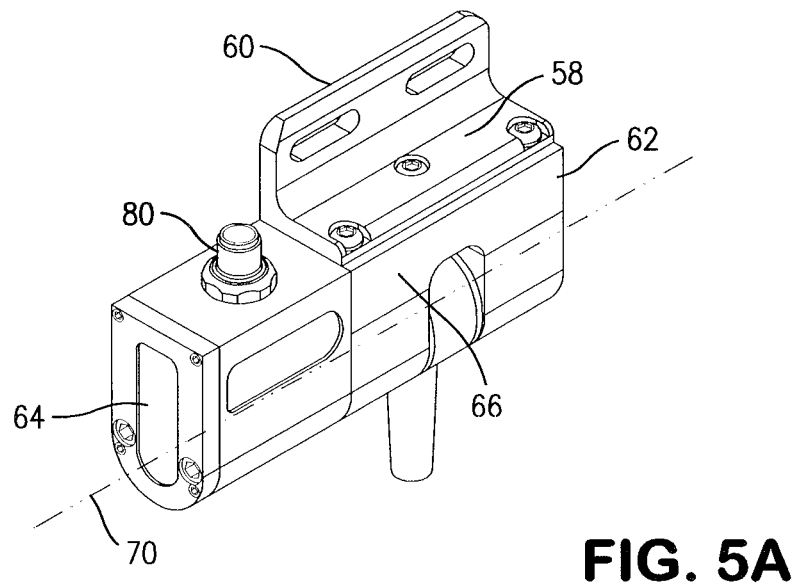
FIGS. 5A and 5B are oblique right side and left side views, respectively, of the universal nozzle assembly of FIG. 4, with components connected together.
Figure 5B:
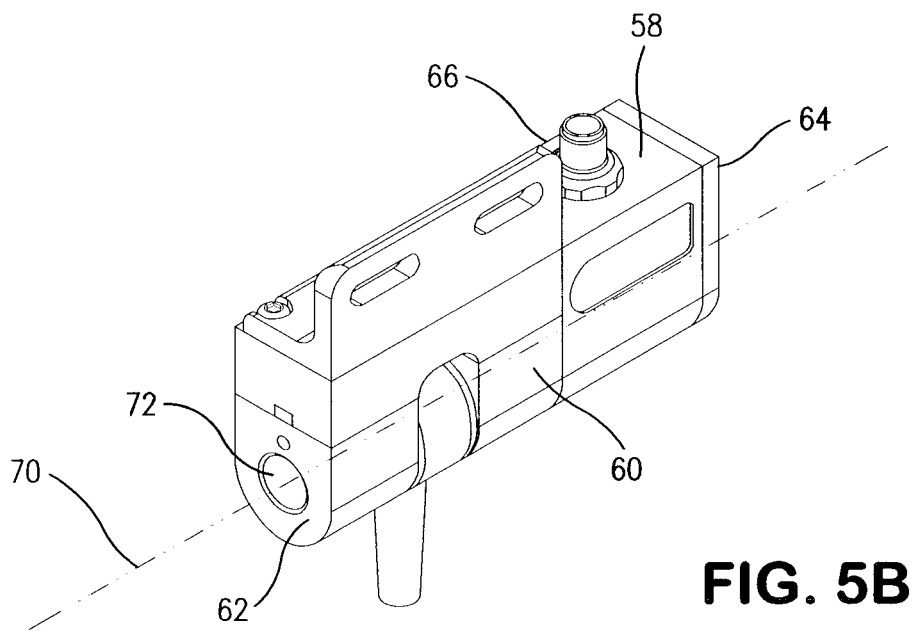

FIGS. 5 A and B show the NA 28 in front-back and back-front isometric views and with identification of the top 58, left 60, rear 62, front 64, and right 66 faces of the unit and centerline of rotation 70. Port 72 in the rear face provides a receptacle for the fluid line to enter the nozzle assembly.

Figures 6A, 6B:
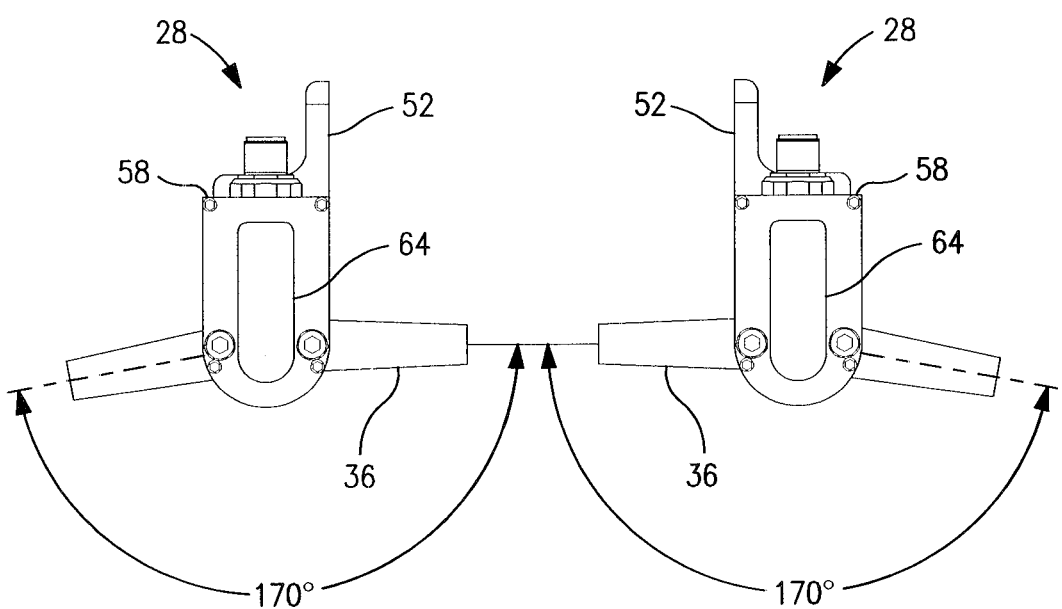
FIGS. 6A and 6B show a front view of the nozzle assembly of FIG. 5, in alternative orientations with a maximum range of nozzle travel of about 170 deg.
Figure 7A:
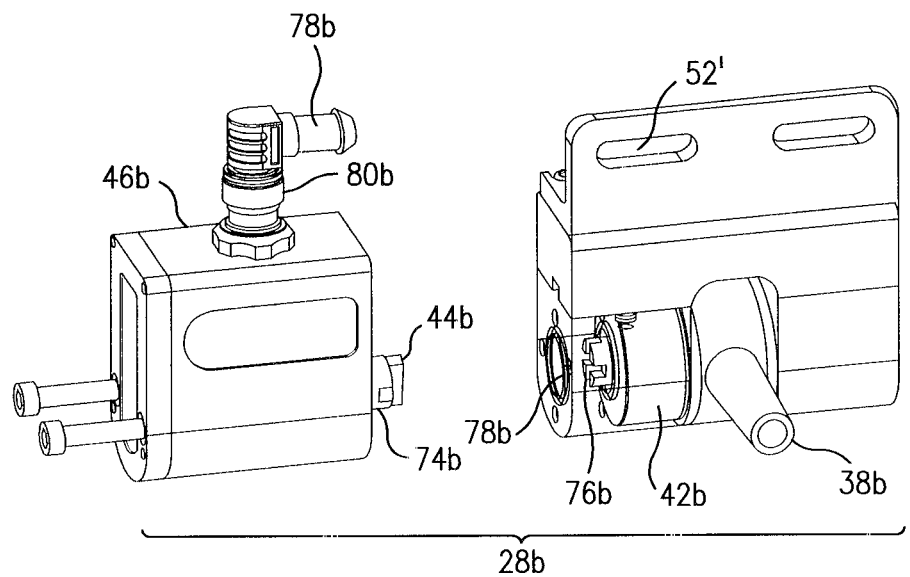
FIGS. 7A and 7B are partially exploded isometric views from the top and bottom, respectively, of the same pair of nozzle assemblies configured for different travel orientation.
Figure 7A:
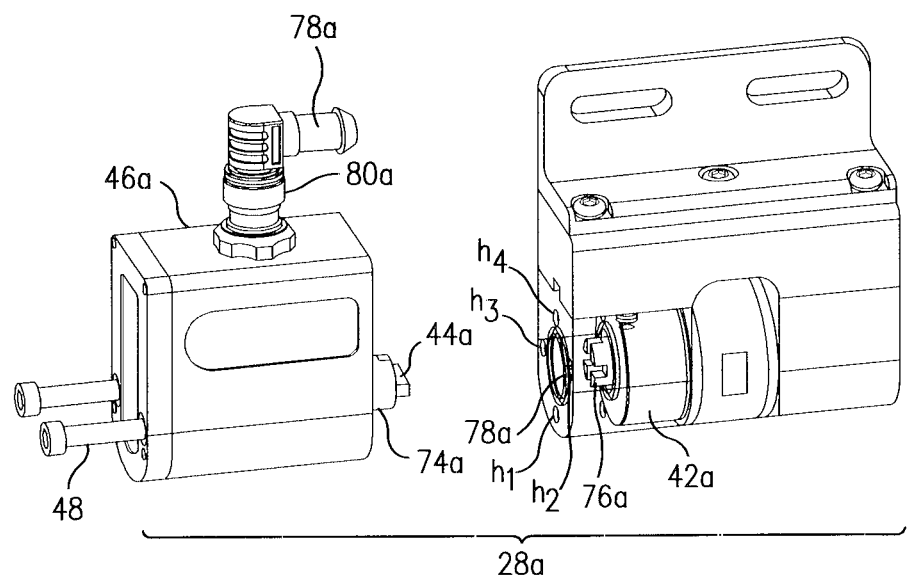
Figure 7B:
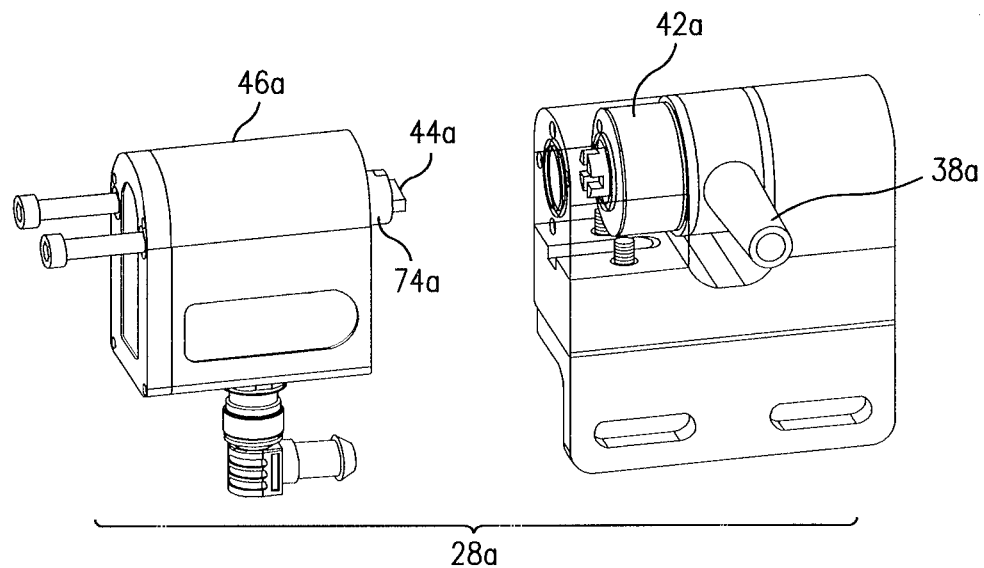
Figure 7B:
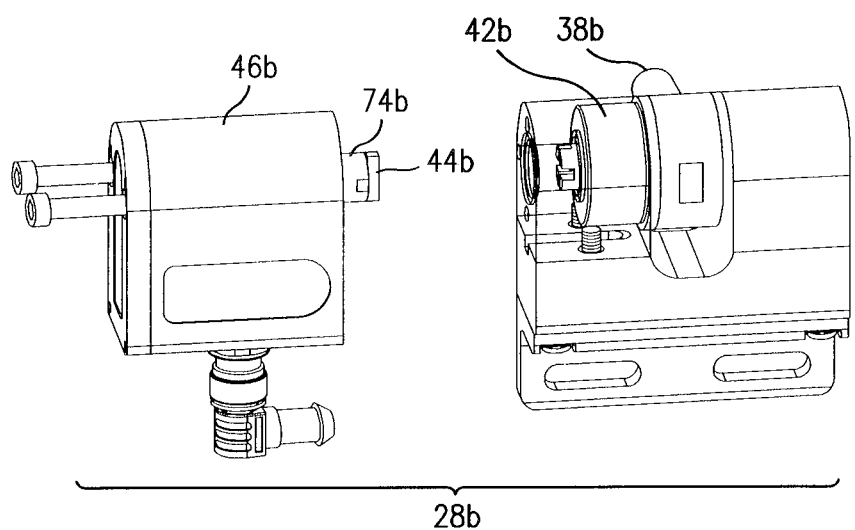

As indicated in FIGS. 6A and B, the NA 28 preferably has a maximum programmable travel range of 170 degrees. However, since a range of 90 degrees or less is suitable for most applications, travel is typically limited by software to a maximum of 90 degrees. The NA has a unique ability to be easily configured to orient the range of travel to occur through opposite quadrants. As viewed from the front face 64 of the EMA, a normal travel orientation is considered to range from the fully clockwise (CW) 9 o'clock position, to the fully counter-clockwise (CCW) 6 o'clock position. As viewed from the front face of the EMA, a reverse travel orientation is considered to range from the fully CCW 3 o'clock position, to the fully CW 6 o'clock position.

The clock positions referred to above are stated to provide a point of reference based upon the unit being viewed such that the top face 58 is parallel to a horizontal axis. The device can be physically mounted and configured to operate in any other axis plane. FIG. 6A shows the NA configured with reverse travel orientation showing the maximum travel range of 170 degrees. The angle bracket 52 is shown in reverse orientation. FIG. 6B shows the NA configured with normal travel orientation with the maximum travel range of 170 degrees. The angle bracket 52 is shown in normal orientation.

FIGS. 7 A and B further clarify how the NA is configured for normal or reverse travel orientation. FIG. 7A shows two NA's, one 28a configured for reverse travel orientation and another 28b configured for normal travel orientation. In FIGS. 7a and 7B, the nozzle assembly is shown in isometric views from both the right side and left side with FIG. 7A showing the top of the unit facing up and FIG. 7B showing the bottom of the unit facing up.

With the EMA 46a unfastened from the rotor block 42a, for normal travel orientation the EMA output shaft 74a with key 44a is rotated such that the portion of the drive key 44a that protrudes from output shaft 74a and engages drive slot 76a through bore 78a is oriented horizontally. In addition, prior to fastening the EMA 46a, rotor, is oriented such that the nozzle tube 38a is facing the fully CW 9 o'clock position and mating drive slot 76a is oriented horizontally.

With the EMA 46b unfastened from the rotor block 42b, for reverse travel orientation the EMA output shaft 74b with key 44b is rotated such that the portion of the drive key 44b that protrudes from the output shaft 74b and engages drive slot 76b through bore 78b is oriented vertically. In addition, prior to fastening EMA 46b, the rotor is oriented such that the nozzle tube 38b is facing the fully CCW 3 o'clock position and mating drive slot 76a is oriented vertically.

Each of the EMA units 46 has a cable connector 78a, 78b for receiving electrical power and control signals.

With respect to FIGS. 7 and 8, it is notable that there are four mounting holes h1, h2, h3, and h4 situated in a 90 degree bolt circle pattern in the front of the rotor block 42 to allow the EMA 46 to be mounted in one of four orientations with any one of the two screws 48. The purpose of the four EMA mounting orientations is to change the physical shape of the device to provide maximum flexibility for it to be installed on the machine tool body with screws 82 through the oblong slots 52' in the projecting leg of angle bracket 52, in various locations while avoiding interference with other objects while allowing access to the electrical connection(s) on the EMA.

Figure 8A:
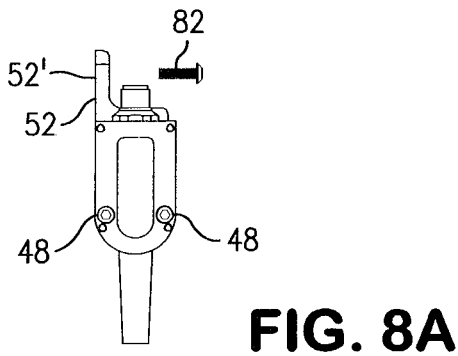
FIGS. 8A-8H show front and oblique side views from the right (corresponding to FIG. 5A), of four combinations of how the electromagnetic actuator and rotor block can be connected together.
Figure 8B:
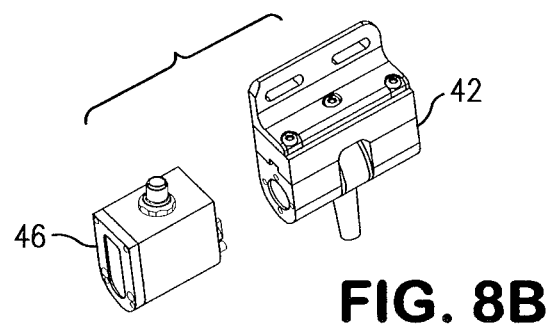
Figure 8C:
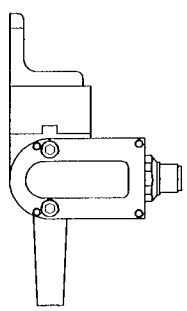
Figure 8D:
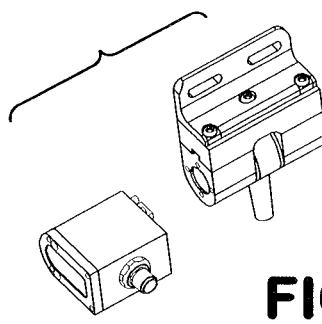
Figure 8E:
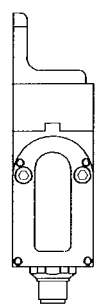
Figure 8F:
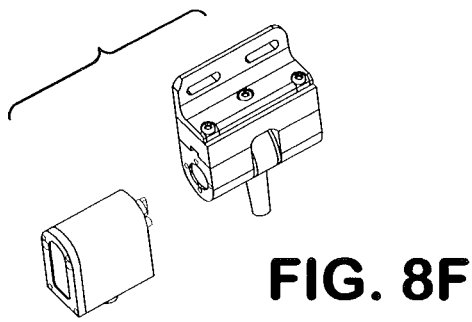
Figure 8G:
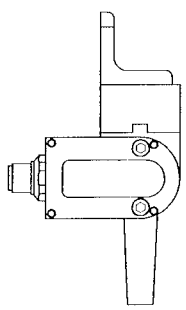
Figure 8H:
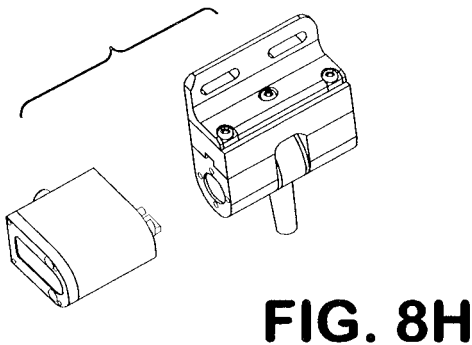

FIG. 8A shows the front of the EMA mounted normally, and FIG. 8B is an isometric view with EMA detached, oriented in the normal position. FIG. 8C is a front view with the EMA mounted at the 90 degree position and FIG. 8D is an isometric view with EMA detached, oriented at the 90 degree position. FIG. 8E is a front view with EMA mounted at the 180 degree position and FIG. 8F is an isometric view with EMA detached, oriented at the 180 degree position. FIG. 8G is a front view with EMA mounted at the 270 degree position and FIG. 8H is an isometric view with EMA detached, oriented at the 270 degree position.

Figure 9:
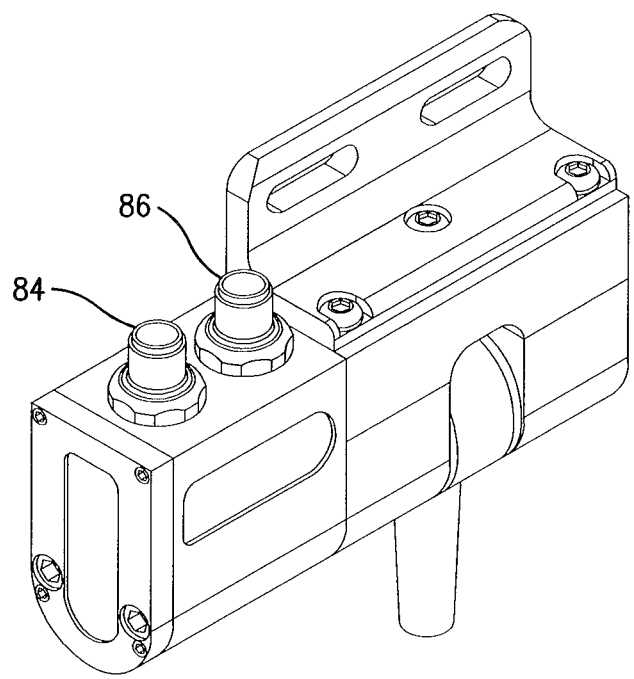
FIG. 9 shows the daisy chain version of the electromechanical actuator.

Whereas FIG. 5 shows the NA with an analog version of the EMA, having a single connector 80, FIG. 9 shows a daisy chain version of the EMA, having two connectors, 84, 86. Aside from the EMA, all other components of the analog and daisy chain NA's are the same.

Based on the foregoing description, it should be understood that in general, each cutting tool is mountable in a rotatable spindle and that the spindle is mounted in a head that is displaceable relative to the work piece (e.g., vertically). As the head moves up and down the spindle and cutting tool move up and down the same distance. This is true in almost all machining operations, but not absolutely necessary. Without using RTO, there would be no efficient way for the nozzles to reposition to compensate for head displacement should the nozzles be mounted elsewhere and not affixed to the head.

In the general case, since the head, spindle and cutting tool move the same vertical distance during machining of the work piece, once the nozzles are aimed at say a specific point (or set to sweep between two points) on cutting tool #1, they will remain aimed at the same point of cutting tool #1 (or sweep range) throughout the machining of the work piece by that cutting tool. However, there are cases where at a particular point in a cut with a particular tool, it could be advantageous to move the nozzle(s) to aim at a different point on the same tool, or change the sweep range. Using RTO according to the present invention, it becomes possible to literally send a command to the MCU to make nozzle adjustments during the cut with a particular tool in the spindle.

Programming sets the aiming of each nozzle for each cutting tool. Programming can be either via synchronized mode wherein an algorithm (such as in the Appendix) determines how all nozzles should move simultaneously for aiming at a common point during operation, or independently by pre-aiming each nozzle assembly individually and recoding the settings. In addition, the nozzles also move simultaneously during sync mode programming using the DOE. In operation, the nozzles are automatically aimed at and stay at the points corresponding to the cutting tool in the spindle, as determined during programming, but as noted above, re-aiming is possible in response to receipt of an RTO command during the cut.

The present invention is also applicable to multiple nozzles that are mounted on a stationary part of the machine tool (i.e., which does not displace with the spindle). This would require programming not only for changing the aiming point on each tool but also programming for how to adjust the angulation of each nozzle as the spindle is displaced during operation. This additional programming can be readily accomplished based on an extension of the algorithm of the Appendix.

APPENDIX

Terms

| | |
|---|---|
| ZD1, ZD2 | Vertical displacement of NA1 and NA2 rotational centerline above or below FRP |
| XD1, XD2 | Lateral displacement of NA1 and NA2 rotational centerline from spindle centerline |
| UL1, UL2 | Upper limit angular set point of NA1, NA2 such that projected streams intersect spindle centerline at same point, measured relative to zero angle positions of NA1, NA2 |
| LL1, LL2 | Lower limit angular set point of NA1, NA2 such that projected streams intersect spindle centerline at same point, measured relative to zero angle positions of NA1, NA2 |
| R1, R2 | Angular travel range of NA1, NA2 computed as R1 = LL1-UL1, R2 = LL2-UL2 |
| POS1, POS2 | Angular position of NA1, NA2 |
| FRP | Fixed Reference Point |

Synchronization Setup Mode (SSM)

Since the physical measurements of ZD1,ZD2,XD1, and XD2 are difficult to determine during installation, and trigonometric calculations are expensive to implement in the MCU, another method is used. After the nozzle assembles (NA1,NA2) are mounted to the machine, and connected to the MCU, the values of UL1,UL2,LL1, and LL2 are set as follows:

1. Coolant flow is projected from NA1 and NA2 at a tool mounted in the spindle.
2. Using the DOE, NA1 is aimed so that the coolant stream hits the upper-most point of the tool. This position is stored in the MCU as UL1.
3. Using the DOE, NA2 is aimed at the same point on the tool. This position is stored in the MCU as UL2.
4. Again using the DOE the coolant stream from NA1 is aimed to hit the tool at the lowest possible position. This value is stored in the MCU as LL1.
5. The coolant stream from NA2 is then aimed at the same lower point on the tool using the DOE. This value is stored as LL2 in the MCU.
6. The travel range of each NA is then computed by the MCU using R1=LL1-UL1 and R2=LL2-UL2.
7. The larger of the two ranges is determined and is stored as the "master range" (MR), and its associated NA (NA1 or NA2) is designated NAM. The smaller range is stored as the "slave range" (SR) and its associated NA is designated NAS.
8. The slave ratio (SRR) is computed as SRR=(N×SR)/MR where N is a whole number, preferably a power of 2 (2, 4, 8, 16 . . . ) applied to make the results easily computable by small-scale microprocessors. The master ratio (MRR) is equal to "N" for future computations.
9. During operation, a commanded position (COMPOS) produced from the DOE during programming, or retrieved from memory during automatic operation, and transmitted to the nozzle assemblies (NAM,NAS) through the following formula:

a. NAM=((COMPOS×MRR)/$N$)+UL1 b. NAS=((COMPOS×SRR)/$N$)+UL2

(Note that by using a direct power of 2 (2, 4, 8, 16 . . . ) for the value of N the division operation can be executed by simply right-shifting the dividend an appropriate number of bits, saving execution speed).

The invention claimed is:

1. A cooling system for a machine tool having a cutting tool in a spindle that is displaceable relative to a work piece along a spindle axis, comprising:
   a plurality of nozzle assemblies, each independently mountable on the machine tool and connectable to a source of cooling fluid;
   a respective nozzle pivotally supported in each nozzle assembly, wherein each nozzle defines a nozzle axis along which cooling fluid can be directed from each nozzle assembly; and
   a control system operatively associated with said plurality of nozzle assemblies, for delivering control signals to a distinct electro mechanical actuator located at each nozzle that pivot each nozzle independently to align the respective nozzle axes relative to respective target positions in the machine tool, whereby respective flows of cooling fluid from said plurality of nozzles can each be directed to any respective target position.

2. The cooling system of claim 1 wherein
   the machine tool has a plurality of cutting tools;
   each cutting tool has a respective optimal cooling requirement target relative to the spindle axis; and
   for each cutting tool mounted in the spindle along the spindle axis, the control system recognizes which of the plurality of tools is in the spindle and delivers control instructions to a plurality of nozzle assemblies, whereby said plurality of nozzle assemblies is synchronized for each nozzle to direct cooling fluid simultaneously to a common optimal target position that is specific to the requirement of the cutting tool in the spindle.

3. The cooling system of claim 1, wherein
   the spindle is mounted in a machine tool head which is linearly displaceable toward and away from the work piece;
   the nozzle assemblies are mounted on the head; and
   one nozzle directs cooling flow to a point target position on the spindle axis and the other nozzle directs a sweeping target position flow along the spindle axis.

4. The cooling system of claim 1, wherein the control system includes
   a data memory for associating a target position with each of a plurality of cutting tools mountable in the spindle of a particular machine tool;
   means for determining which particular cutting tool is mounted in said spindle; and
   an actuator in each nozzle assembly, responsive to data in said memory and to the determination of which particular cutting tool is mounted in said spindle, for pivoting at least two nozzles to respective target positions.

5. The cooling system of claim 4, wherein
   a data line serially connects the nozzle assemblies in a daisy chain;

whereby the control system delivers instructions for all nozzle assembly actuators on said data line, each nozzle assembly recognizes the actuator instructions pertaining to it, and passes all the actuator instructions to the next nozzle assembly.

6. The cooling system of claim 2, wherein the control system includes a data memory for associating a target position with each of a plurality of cutting tools mountable in the spindle of a particular machine tool; and an actuator in each nozzle assembly, responsive to data in said memory and to the determination of which particular cutting tool is mounted in said spindle, for pivoting said at least two nozzles to the common target position.

7. The cooling system of claim 6, wherein a data line serially connects the nozzle assemblies in a daisy chain;

whereby the control system delivers instructions for all nozzle assembly actuators on said data line, each nozzle assembly recognizes the actuator instructions pertaining to it, and passes all the actuator instructions to the next nozzle assembly.

8. A cooling system for a machine tool having a cutting tool in a spindle that is displaceable relative to a work piece along a spindle axis, comprising:

a plurality of nozzle assemblies, each independently mountable on the machine tool and connectable to a source of cooling fluid;

a respective nozzle pivotally supported in each nozzle assembly, wherein each nozzle defines a nozzle axis along which cooling fluid can be directed from each nozzle assembly; and a control system operatively associated with said plurality of nozzle assemblies, for delivering control signals that pivot each nozzle independently to align the respective nozzle axes relative to respective target positions in the machine tool, whereby respective flows of cooling fluid from said plurality of nozzles can each be directed to any respective target position, wherein each nozzle assembly comprises a body connectable to a source of fluid coolant;

a nozzle that is pivotable in the body and extends along a nozzle axis from a rotating coolant union integrated with the body;

a bracket on the body for mounting the nozzle assembly to the machine tool; and a distinct electro mechanical actuator detachably mounted on the body in a plurality of orientations relative to the body, with a drive element responsive to said control system, operatively connected to the rotating coolant union for pivoting the nozzle.

9. The cooling system of claim 1, wherein each of a plurality of cutting tools is selectively mountable within the same spindle;

when a selected cutting tool has been mounted in the spindle, the control system pivots each nozzle to align the respective nozzle axes relative to respective target positions on the cutting tool;

as the spindle is displaced relative to the work piece the nozzle axes remain aligned at the same respective target positions on the cutting tool, and selectively remain fixed on the target position or sweep relative to the target position.

10. A coolant nozzle assembly for mounting on a machine tool having a spindle axis, comprising:

a body connectable to a source of fluid coolant;

a nozzle that is pivotable in the body and extends along a nozzle axis from a rotating coolant union integrated with the body;

a bracket for mounting the body on a machine tool;

a distinct electro mechanical actuator detachably mounted on the body and having a drive element that is operatively connected to the rotating coolant union for pivoting the nozzle;

whereby the body is mountable on the machine tool with said bracket in at least two alternative locations around the spindle axis such that when in any of the alternative locations the nozzle axis is directed at and pivotable along the spindle axis; and wherein the body has a plurality of first fastener members and the electromechanical actuator has at least one second fastener member such that the at least one second fastener member on the actuator can be alternatively mated with any of at least two different of said first fastener members and thereby define at least two different configurations of the nozzle assembly;

the body has a front, back, top, bottom, and left and right sides;

the mounting bracket is at the top of the body;

the nozzle has an inner end on the union, which is fluidly accessible through an opening in the back of the body and has an axis of rotation that extends longitudinally from front to back within the body and the nozzle has a neutral position projecting vertically downward from the bottom of the body and an active position that is angulated toward one side relative to vertical;

the electromechanical actuator has a front, back, top, bottom, and left and right sides, an external electric connector, and a drive shaft that projects from the back into another opening in the front of the body;

the union and drive shaft have a cooperating key and slot whereby the nozzle is pivotable by the drive shaft between the neutral position and said active position;

the mounting bracket extends vertically from the top, closer to one of the left or right sides of the body;

the first fastener members are at the front of the body in the form of four mounting holes in a circle pattern; and the second fastener members are in the form of two bolts passing from front to back in a compatible pattern whereby the actuator is mountable on the body in any one of four orientations thereby defining four selective alternative configurations of the nozzle assembly.

11. The coolant nozzle assembly of claim 10, wherein the drive shaft has a key and the cooperating slot is operatively connected to the nozzle such that the nozzle can be preset to a particular orientation before the key engages with the slot.

12. A set of two coolant nozzle assemblies as defined in claim 10, wherein the mounting bracket on the body of a first of said two coolant nozzle assemblies extends vertically closer to the left side of the respective body and the mounting bracket on the body of a second of said two coolant nozzle assemblies extends vertically closer to the right side of the respective body; and the nozzle assemblies are attached to a machine tool.

13. A method for delivering cooling fluid to a cutting tool on a displaceable spindle of a machine tool comprising:

mounting first and second nozzle assemblies on the machine tool offset from the spindle axis different respective distances, each nozzle assembly having a distinct electromechanical actuator for pivoting a nozzle that dispenses a cooling fluid in a nozzle axial flow direction;

connecting the nozzle assemblies to a control system that coordinates the actuators to aim the axial flow direction of each of said plurality of nozzles to a respective target position along the spindle axis, wherein said control system delivers control signals to each distinct electro mechanical actuator located at each nozzle that pivot each nozzle independently to align the respective nozzle axes relative to respective said target positions, whereby respective flows of cooling fluid from said plurality of nozzles can each be directed to any respective target position; and initiating flow through each nozzle, directed at the target positions.

14. The method of claim 13, wherein each of a plurality of cutting tools is selectively mountable within the same spindle;

the control system accesses input data which identifies a particular cutting tool that is mounted in the spindle; and wherein when a selected cutting tool has been mounted in the spindle, the control system pivots each nozzle to align the respective nozzle axes relative to respective target positions on the cutting tool; and as the spindle is displaced relative to the work piece the nozzle axes remain aimed at the same respective target positions on the cutting tool.

15. The method of claim 13, wherein the control system includes a data memory for associating a target position with each of a plurality of cutting tools mountable in the spindle of a particular machine tool and means for determining which particular cutting tool is mounted in said spindle; and in response to the data in said memory and to the determination of which particular cutting tool is mounted in said spindle, an actuator in each of at least two nozzle assemblies pivots a respective at least two nozzles to the common target position.

16. The method of claim 15, including generating real time data output (RTO) indicative of the particular cutting tool that is mounted in the machine tool spindle and the time dependent position of the cutting tool in contact with the work piece;

in response to the RTO data, identifying in the control system, which particular cutting tool is mounted in said spindle; and delivering instructions through the control system to all nozzle assembly actuators on a daisy chain data line, whereby each nozzle assembly recognizes the actuator instructions pertaining to it, and passes all the actuator instructions to the next nozzle assembly.

17. The cooling system of claim 1, wherein the nozzle assemblies are laterally offset from the spindle axis, with the nozzles pivotable about pivot centers that are offset different distances from the spindle axis.

18. The cooling system of claim 1, wherein the control system includes logic for delivering a first control signal to aim one nozzle at a point target position on the spindle axis and delivering a second control signal to synchronously sweep another nozzle along the spindle axis.

19. The cooling system of claim 17, wherein the control system includes logic for delivering a first control signal to aim one nozzle at a point target position on the spindle axis and delivering a second control signal to synchronously sweep another nozzle along the spindle axis.

20. The cooling system of claim 17, wherein the control system includes logic for delivering a first control signal to sweep one nozzle between a first set of two point target positions on the spindle axis and delivering a second control signal to synchronously sweep another nozzle along the spindle axis between a second set of two point target positions on the spindle axis; and logic for maintaining a constant spatial relationship between the sweeps as the spindle is displaced.

\* \* \* \* \*